W. F. KNEIP.

COMBINATION UNDERGARMENT.

No. 11,325. Reissued Apr. 18, 1893.

Witnesses
John W. Adams
Louis M. Whitehead.

Inventor
William F. Kneip
by:- Dayton, Poole & Brown.
his Attorneys.

UNITED STATES PATENT OFFICE.

WILLIAM F. KNEIP, OF YPSILANTI, MICHIGAN, ASSIGNOR TO THE HAY & TODD MANUFACTURING COMPANY, OF SAME PLACE.

COMBINATION UNDERGARMENT.

SPECIFICATION forming part of Reissued Letters Patent No. 11,325, dated April 18, 1893.

Original No. 374,307, dated December 6, 1887. Application for reissue filed March 17, 1893. Serial No. 466,564.

*To all whom it may concern:*

Be it known that I, WILLIAM F. KNEIP, of Ypsilanti, in the county of Washtenaw and State of Michigan, have invented certain new and useful Improvements in Undergarments; and I do hereby declare that the following is a full, clear, and exact description thereof, reference being had to the accompanying drawings, and to the letters of reference marked thereon, which form a part of this specification.

This invention relates to an improved knit under-garment of that kind known as a "combination garment," or one in which a shirt and drawers are combined in one article, the invention being more particularly applicable to such garments as made for ladies.

In a combination garment made in accordance with my invention, the garment is formed mainly by a piece or pieces of knitted fabric extending continuously from the top to the bottom of the garment through the body part and legs. The parts forming the legs of the garment are separated from each other to a point above the enlarged part of the garment which covers the hips, and to the rear edges of both sides or halves thus separated are attached additional pieces or strips of fabric of suitable width to give the necessary fullness to the garment at the hips, said pieces or strips being sewed at their edges to the main parts of the garment at the parts of the latter extending from the point of separation mentioned downwardly to the tops of the seams at the inner sides of the legs. The upper ends of the additional strips referred to are made tapering or pointed, and are attached at both of their tapered edges to the margins of both adjacent edges of the main parts of the garment, the two pieces or strips being overlapped at their upper ends in a manner hereinafter more fully explained.

Figure 1:
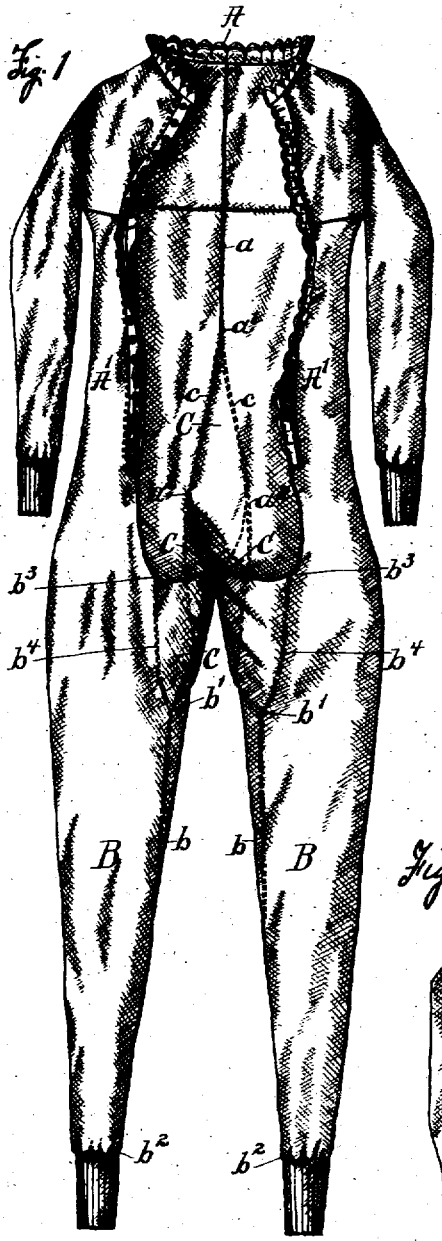
Figure 2:
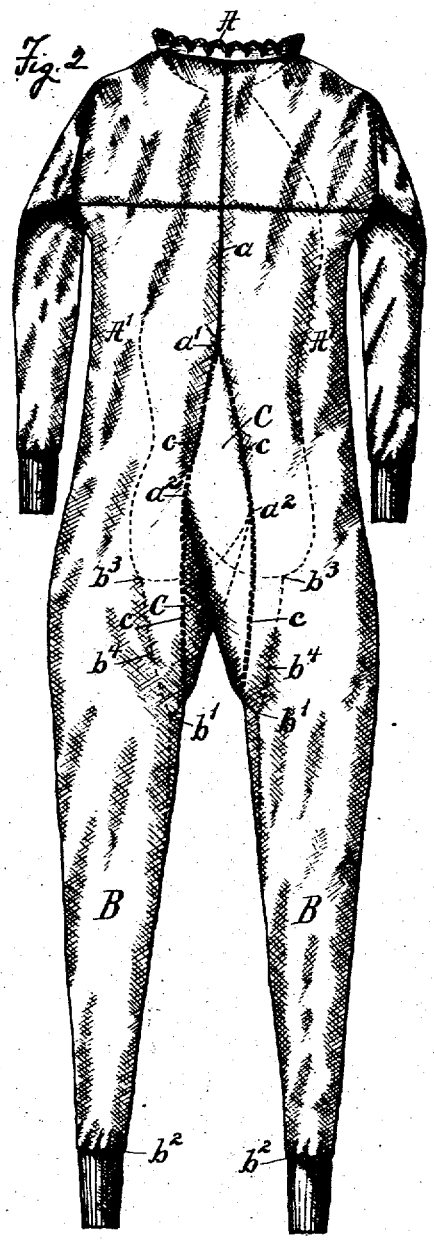
Figure 3:
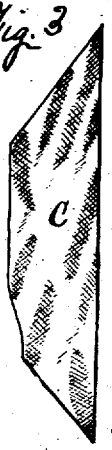

In the accompanying drawings, illustrating my invention, Figure 1 shows a combination garment constructed in accordance with my invention as viewed from the front. Fig. 2 is a rear view of the same. Fig. 3 is a view of one of the pieces or strips employed to give the necessary fullness at the hips.

In the drawings, A is the upper or body part of the garment, and B B the lower or leg portions thereof. The knitted fabric composing the body part is, in the particular construction shown, composed of two sides or halves, A′ A′, made continuous with the leg portions, and united at the middle of the back by means of a seam *a*, the garment being arranged to open in front, and having buttons and button-holes or other fastening devices for connecting its front edges. The seam *a*, uniting the body parts A′ A′, terminates at a point, *a′* above the part of the garment which encircles or covers the hips and to the rear margins of said side pieces are attached two separate knitted strips or sections, C C, which are for the purpose of giving the necessary size or fullness to the garment at the hips.

The parts A′ A′ and B B are originally made in flat webs, with practically parallel side margins, except in their lower parts, which are tapered to form the legs of the garment, the tapered margins of the said parts B B being joined to form seams *b b* at the inner side of the legs, extending from *b′* to $b^2$. Each of the pieces C C is made of considerably greater length than width, with its longer side margin of the same length as the rear straight marginal part from *a′* to *b′* of the rear edge of the side piece, A′ B. Said piece C is sewed to the rear margin of the side piece, A′ B, in its part from *a′* to *b′*, so as to form a seam, *c*, extending from the top of the leg-seam *b* to the point *a′*, at which the side pieces of the body are united in the back of the garment. The said piece C is also sewed at its lower edge or end to the front marginal part, *b′* to $b^3$, of the leg portion B, thereby forming a seam, $b^4$. The lower end of the piece C is preferably inclined or oblique, as shown, in order to give a desired shape to the garment. At its upper end or margin the strip C is attached to the opposite side piece, A′, along its marginal part *a′* to $a^2$; the said upper end of the strip being beveled or pointed, as shown, to afford a gradual enlargement of the body part of the garment in approaching the hips. Both the strips C C are attached at their upper ends to the edges of both body side pieces, in the manner set forth, so that the upper ends of the pieces C C overlap each other and form a double thickness of fabric at this point, in the manner clearly indicated in the drawings. When the pieces C C are sewed in place in the manner described, their free margins extend from the points $b^3$ $b^3$ at the upper ends of the seams $b^4$ $b^4$ rearwardly to the points $a^2$ $a^2$ at the lower ends of the seams $c$ $c$, connecting the pieces with the opposite sides or halves of the garment, so that the said free margins are drawn or held in a position to keep the garment closed at this point. The upper ends of the inserted pieces C C must necessarily be tapered to a point or angle, as shown, in order to fit between the divergent edges of the main parts or halves of the garment below the point of separation of the latter, but the general sizes and proportions of the inserted pieces will in practice be varied to correspond with the size and shape of the other parts composing the garment.

The garment made in two main parts, as herein shown, is of that kind which is made of flexible knit fabric, such as produced upon single-thread machines, as for instance, that known as the "Lamb" machine. The same novel feature of construction herein shown may, however, be equally well applied to garments made of "woven" knit fabric, or that produced by a machine employing a number of simultaneously-acting needles and a plurality of threads. In garments made of either of the kinds of knitted fabric mentioned the main side pieces composing the garment may each consist of two or more pieces, instead of a single piece, as herein shown. It is not essential, furthermore, that a garment embodying my invention should have a seam in the back, inasmuch as that part of the back of the garment above the inserted pieces C C may be made or knitted in one piece.

A main advantage gained by the construction above described is that the fullness at the hips, in a combination garment, necessary to a comfortable fit, may be thereby obtained in an article consisting of but few parts of simple shape, which can be readily put together.

My invention has especial advantages as applied to knit goods made upon a Lamb machine, for the reason that the two parts or sides consitituting the main part of the garment may be easily made upon a machine of this character. Such machines are not usually adapted for knitting a web of great width and by reason of this fact knit garments of this kind have usually been made of four main parts united at the sides of the garment and in the back. By making the garment with supplementary pieces C C, as above described, the main side parts, being of substantially the same width, may be economically made upon machines of this kind, while at the same time a better fitting article is produced. Important advantages are, however, also gained by the employment of the construction described in woven knit goods and other material used for making garments of the character described, owing to the more perfect fit thereby obtained and the greater simplicity of manufacture, and in carrying out my invention therefore, any kind of material suitable for the manufacture of the article may be used.

I claim as my invention—

A combination garment comprising body and leg portions made continuous with each other, and separated at the lower part of the back of the garment to a point above the enlarged part thereof which covers the hips, and strips C C, tapered to points at their ends and secured at one of their longer sides to the edges of the main part of the garment, said strips being attached at the side margins of their tapered upper ends to both rear edges of the separated main parts of the garment below the point of separation of the latter and at their lower ends to the front edges of said main parts, substantially as described.

In testimony that I claim the foregoing as my invention I affix my signature in presence of two witnesses.

WILLIAM F. KNEIP.

Witnesses:
W. H. WUBBEN,
MOSES T. HALE.